May 28, 1968     E. S. HILL, JR     3,385,804
FOAMABLE POLYSTYRENE COMPOSITIONS CONTAINING
FATTY ACID AMIDE LUBRICANTS
Filed Dec. 14, 1964
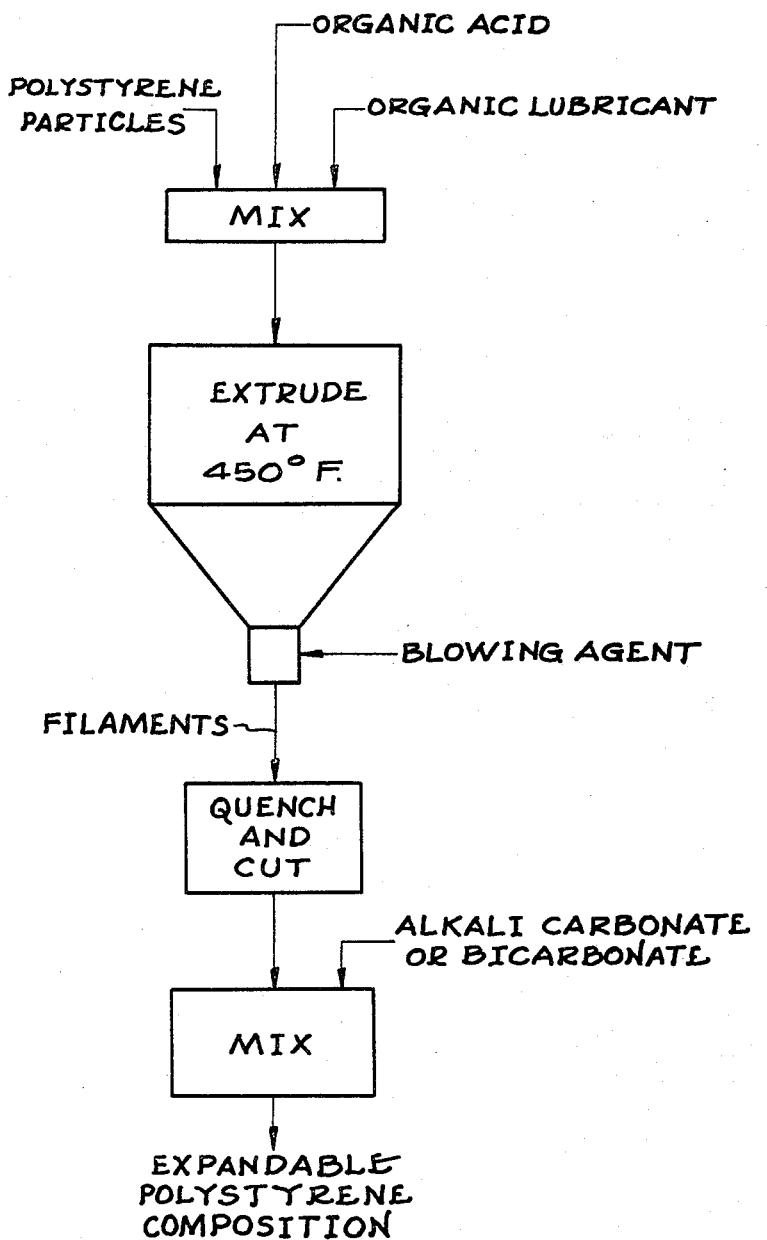
INVENTOR.
EARL S. HILL, JR.
BY Stanley J Price
his ATTORNEY.

3,385,804
FOAMABLE POLYSTYRENE COMPOSITIONS CONTAINING FATTY ACID AMIDE LUBRICANTS
Earl S. Hill, Jr., Coraopolis, Pa., assignor to Koppers Company, Inc., a corporation of Delaware
Filed Dec. 14, 1964, Ser. No. 417,999
14 Claims. (Cl. 260—2.5)

ABSTRACT OF THE DISCLOSURE

An expandable polystyrene composition is produced by extruding, at a temperature of about 450° F., a mixture of polystyrene particles, a solid organic acid, and a lubricant which is an amide of a fatty acid containing between 12 and 30 carbon atoms. The extrudate is coated with an alkali metal carbonate or bicarbonate to form the expandable composition.

This application relates to a new expandable polystyrene composition and to the method of producing the polystyrene composition.

Houston et al. Patent No. 2,941,964 discloses that a composition comprised of polystyrene, an aliphatic blowing agent and two blowing agent adjuncts, a solid organic acid and a carbon dioxide liberating agent, can be extruded to produce a low density formed polystyrene structure. Pottenger Patent No. 3,089,857 discloses that one of the blowing agent adjuncts may be extruded with the blowing agent and polystyrene in a conventional plastics extruder to encapsulate the blowing agent and blowing agent adjunct in the polymer and form filaments which are quenched before expansion occurs and are comminuted to a desired size. The comminuted filaments are adjusted to an extrusion grade expandable polystyrene composition with the overall proper blowing agent and blowing agent adjuncts in proportions so that it may thereafter be extruded at a different location in a conventional plastics extruder to form a foamed polystyrene having the desired low density.

I have found it best to extrude an admixture of polystyrene, blowing agent and a solid organic acid blowing agent adjunct as a filament, cool the filament before expansion occurs, comminute the filament to the desired sized particles and then mix the blowing agent adjunct which is the carbon dioxide releasing agent with the particles.

I have also found that it is possible to extrude a foamed polystyrene structure from a composition that includes the blowing agent adjuncts but that does not include an aliphatic blowing agent. In accordance with this invention the admixture of polystyrene and solid organic acid blowing agent adjunct is extruded as a filament or strand, the extrudate is cooled and then comminuted to particles, annd the particles are mixed with a blowing agent adjunct that is a carbon dioxide releasing agent. The composition is then employed in a subsequent extrusion to form a foamed polystyrene structure.

It has been found, however, that in directly combining the blowing agent adjunct with the polystyrene polymer, a high melt temperature is required in the extruder in order to extrude the admixture as a filament. For some reason, the presence of the aliphatic blowing agent enables the extrusion to be carried out at a lower melt temperature. For example, polystyrene beads having an aliphatic blowing agent incorporated therein may be extruded at a relatively low temperature of about 250 to 360° F. On the other hand, when this blowing agent is absent and an admixture of polystyrene particles and a blowing agent adjunct such as a solid organic acid is extruded in a conventional plastics extruder, the melt temperature is substantially higher, for example, about 450° F.

It is conventional to employ a lubricant to reduce pressure losses and improve the flow of the polymer composition through the extruder. The lubricant most commonly used is zinc stearate. The higher temperature of the melt necessary in this invention due to the absence of the blowing agent, however, has created problems. Where an admixture of polystyrene polymer, solid organic acid and the metal salt of a fatty acid lubricant are fed to a conventional plastics extruder, an uncontrolled foaming occurs in the extruder at the elevated temperatures so that the extrudate is unsuitable as a latent expandable polystyrene composition.

Surprisingly, it was discovered that a suitable expandable polystyrene extrudate can be obtained when an amide of a fatty acid having from 12–30 carbon atoms is used as the lubricant.

The instant invention comprises an expandable polystyrene composition in the form of extrudate filaments containing an admixture of polystyrene polymer, a solid organic acid, and an amide of a fatty acid that has from 12–30 carbon atoms, which filaments are coated with a carbon dioxide liberating agent that reacts with the solid organic acid during subsequent extrusion to liberate carbon dioxide.

The process for producing the polystyrene composition includes admixing the polystyrene particles with a solid organic acid and an amide of a fatty acid. The admixture is extruded in a conventional plastics extruder. The extrudate filaments are comminuted to any desired size and are coated with a carbon dioxide liberating agent. A blowing agent such as an aliphatic hydrocarbon may, if desired, be injected directly into the extruder barrel during the extrusion process.

This invention contemplates an expandable composition comprising polystyrene, a solid organic acid that has at least 3.0 milli-equivalents of acidic hydrogen per gram, and an amide of a fatty acid containing between 12 and 30 carbon atoms as a lubricant, as particles, and a sufficient amount of the carbon dioxide liberating agent admixed with the particles to produce upon reaction a total of from 0.15 to 6.5 percent by weight water and carbon dioxide based on the weight of the polystyrene particles.

This invention provides an expandable polystyrene composition that has a solid organic acid and an organic lubricant incorporated in a polystyrene filament by extrusion in a conventional plastics extruder.

Other objects and advantages of this invention will become apparent from the following detailed description thereof when the same is read in connection with the accompanying drawing which is a schematic flow diagram of the process.

In accordance with the present invention, polystyrene particles are admixed with a solid organic acid and an amide of a fatty acid lubricant and the admixture as a molten mass is extruded as strands or filaments that are rapidly quenched to prevent foaming and puffing of the filaments. The filaments are comminuted into desired sizes and are coated with a carbon dioxide liberating agent that is adapted to react with the solid organic acid during a subsequent extrusion to liberate carbon dioxide. The coated particles are the expandable polystyrene compositions that may be expanded into a foamed polystyrene composition in a conventional plastics extruder.

The term polystyrene as used herein is intended to include the normally solid homopolymers and copolymers of one or more styrene compounds such as styrene, vinyl toluene, vinyl xylene, isopropyl styrene, ethylvinylbenzene, ar-chlorostyrene, ar-dichlorostyrene, ar-bromostyrene, ar-fluorostyrene and mixtures of such vinyl aromatic compounds wherein a major proportion of the monomer that forms the polymer is the vinyl monomer such as styrene.

The solid organic acids in the preferred form of this invention have at least 3.0 milli-equivalents of acidic hydrogen per gram. Desirable results are obtained, for example, when organic acids having at least 10 milli-equivalents of acidic hydrogen per gram are utilized. Excellent results are obtained utilizing oxalic or citric acid, the latter being preferred from a toxicity standpoint. Other suitable acids are, for example, malonic, maleic, fumaric, succinic, itaconic, citraconic, malic, adipic, formic, acetic, propionic, tartaric, phthalic, butyric, lactic, chloracetic and diglycollic, all of which have at least 10 milli-equivalents of acidic hydrogen per gram. Several of the foregoing solid acids are available in the form of their hydrates, and such hydrates can be used in the practice of this invention. These solid organic acids yield compositions which upon extrusion produce polystyrene having uniform small voids and a low density, for example, five pounds per cubic foot. The amounts of the organic acid and the carbon dioxide liberating agent should be sufficient to produce upon reaction a total of from 0.15 to 6.5 percent by weight water and carbon dioxide based on the weight of the polystyrene particles.

The preferred carbon dioxide liberating agents used herein are alkali and alkaline earth carbonates and bicarbonates. Such adjuncts are illustrated by such compounds as, for example, lithium, sodium, potassium, calcium, strontium, barium, and ammonium carbonates and bicarbonates. Excellent results are obtained by the use of sodium bicarbonate. The criterion of acceptability for a carbon dioxide liberating agent is its ability to react with the aforedescribed solid organic acids at suitable extruder temperatures to yield water and carbon dioxide.

The fatty acid amides usable in accordance with this invention have the general formula RCONH$_2$, where R is an alkyl radical having 11–29 carbon atoms. Generally such amides are prepared by treating the fatty acids with ammonia.

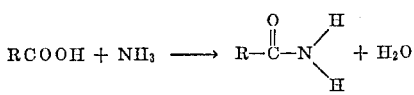

Fatty acid amides are commercially available in over 90 percent purity from capric, lauric, myristic, palmitic and stearic acids and also as mixtures from the fatty acids of coconut oil and the like. These fatty acid amides are wax-like, neutral products which range from a paste to a hard material which can be flaked. Stearamide, for example, has a melting point higher than 100° C.

When it is desired to use a volatile organic blowing agent in addition to the blowing agent adjunct, the volatile organic blowing agent should be a poor solvent for the polymer and have a boiling point not substantially above the heat distortion temperature of the polymer. For instance, it should have a boiling point of 95° C. or lower at atmospheric pressure. Examples of organic compounds that are suitable foaming agents are aliphatic hydrocarbons such as butane, isobutane, pentane, isopentane, neopentane, hexane, heptane. Saturated aliphatic and cyclic perchlorofluorocarbons such as are sold for example under the tradename Freon and tetraalkylsilanes such as tetramethylsilane, tetramethylethylsilane, trimethylisopropylsilane and trimethylnormal propylsilane. Mixtures of any two or more such volatile compounds may be used as the blowing agents. Generally from 5–25 parts per 100 parts of polymer are used.

As used herein the term "conventional" extrusion equipment embraces the various plastic extruders commonly used to extrude polymers of such monomers as, for example, styrene, vinyl and vinylidene chloride, ethylene, acrylonitrile and the like. In these conventional extruders the polymeric material is fed in to a hopper which is not pressurized.

As used herein, the term "parts" is used to indicate parts by weight, unless otherwise indicated.

Example I

A mixture of 100 parts polystyrene particles (Dylene 8), 0.16 part stearamide and 0.3 part anhydrous citric acid was fed to a conventional plastics extruder. The admixture was extruded at a temperature of about 450° F., this high temperature being necessary for proper extrusion. The mass was extruded as strands 0.06 inch in diameter. The extrudate was quenched to form a product that had not foamed or expanded during the extrusion process. The extrudate was chopped into granules of 0.125 inch in length and coated with 0.3 part sodium bicarbonate to form a latent foamable product containing encapsulated citric acid.

The coated particles were then extruded through a conventional extruder as a blown film of foamed polystyrene having a density of about 10 pounds per cubic foot.

Example II

A mixture of 100 parts of polystyrene particles, 0.16 part of ethylene distearamide and 0.3 part of anhydrous citric acid was fed to a conventional plastics extruder. The admixture was extruded as strands at a temperature of about 450° F. and the extrudate was quenched and formed a latent foamable product that did not foam or expand during the extrusion process. The strands were cut into granules and coated with 0.3 part of sodium bicarbonate.

The particles of expandable polystyrene were then extruded through a conventional extruder to form a sheet of foamed polystyrene having a density of about 18 pounds per cubic foot.

Example III

A mixture of 100 parts of polystyrene, 0.16 part of stearamide and 0.3 part of anhydrous citric acid was fed to a conventional extruder. To this extruder was also fed 5 parts of pentane. The admixture was extruded at a die temperature of about 360° F. as strands having a diameter of about 0.06 inch. The extrudate was quenched to form a product that had not substantially foamed or expanded during the extrusion. The extrudate was chopped into granules of 0.125 inch in length and coated with 0.3 part of sodium bicarbonate.

The resulting product was a latent expandable polystyrene. The particles were extruded through a conventional extruder as a blown film of foamed polystyrene having a density of about 5 pounds per cubic foot.

Example IV

The procedure of Example III was repeated except that behenamide was substituted for the stearamide with the same results.

Example V

A mixture of 100 parts of polystyrene particles, 0.16 part by weight zinc stearate and 0.3 part anhydrous citric acid was fed to a conventional plastics extruder. The admixture was extruded at a temperature of about 450° F. and an uncontrolled foaming and puffing occured in the filaments that resulted in an unacceptable extrudate.

Example VI

A mixture of 100 parts of polystyrene particles, 0.16 part of magnesium stearate and 0.3 part of anhydrous citric acid was fed to a conventional plastics extruder. The admixture was extruded at a temperature of about 450° F. and an uncontrolled foaming and puffing occurred in the filaments, resulting in an unacceptable extrudate.

The foregoing has illustrated that the conventional metal salts of fatty acids as used ordinarily in the extrusion of polystyrene and the like polymers are not suitable for producing an extrudable, expandable polystyrene. It is possible that a catalytic or other reaction occurs between the salts of the fatty acids and the normally solid organic acid in the extruder. It is quite surprising that the amides of fatty acids do not evidence this reaction so that the admixture of polystyrene, normally solid organic acid, and fatty acid amide can be extruded without the uncontrolled foaming and puffing that had occurred in the filaments when the conventional fatty acid salts were present. While the composition in accordance with this invention is particularly desirable when the normally solid organic acid component of the blowing agent adjunct alone is being used in the composition, it is equally operable when an organic fluid blowing agent is introduced into the extruder in addition to the blowing agent adjunct.

I claim:
1. The method of producing an expandable polystyrene composition comprising,
    extruding at a temperature of about 450° F. an admixture consisting essentially of 100 parts by weight of polystyrene particles, 0.2–0.5 part by weight of citric acid, and 0.01–3.0 parts by weight of a lubricant selected from the class consisting of amides of fatty acids containing between 12 and 30 carbon atoms,
    quenching the extrudate, and
    coating the quenched extrudate filaments with a sufficient amount of a carbon dioxide liberating agent selected from the class consisting of alkali and alkaline earth carbonates and bicarbonates to produce upon reaction with said citric acid a total of from 0.15% to 6.5% by weight water and carbon dioxide based on the weight of the polystyrene particles.
2. The method of claim 1 in which said lubricant is behenamide.
3. The method of claim 1 in which said lubricant is ethylene distearamide.
4. The method of claim 1 in which said lubricant is stearamide.
5. The method of claim 1 in which a volatile organic blowing agent is incorporated into the plasticized composition prior to the extrusion of the composition as a filament.
6. The method of claim 1 in which said carbon dioxide liberating agent is sodium bicarbonate.
7. A method of producing foamed extruded polystyrene comprising
    extruding at a temperature of 450° F. an admixture consisting essentially of 100 parts by weight of polystyrene particles, 0.2–0.5 part by weight of citric acid and 0.01–3.0 parts by weight of a lubricant selected from the class consisting of amides of fatty acids that contain between 12 and 30 carbon atoms,
    quenching the extrudate,
    cutting the extrudate filament into particles of preselected sizes,
    coating said particles with a sufficient amount of carbon dioxide liberating agent selected from the class consisting of alkali and alkaline earth carbonates and bicarbonates to produce upon reaction with said citric acid a total of from 0.15% to 6.5% by weight water and carbon dioxide based on the weight of the polystyrene particles, and
    thereafter foaming and extruding said coated filaments in a conventional extrusion machine at a temperature of from about 250° F. to 400° F.
8. A component of an expandable polystyrene composition consisting essentially of 100 parts by weight polystyrene having 0.2–0.5 part by weight citric acid, and 0.01–3.0 parts by weight lubricant incorporated therein by extrusion at a temperature of about 450° F., said lubricant selected from the class consisting of amides of fatty acids that contain between 12 and 30 carbon atoms.
9. A component of an expandable polystyrene composition as set forth in claim 8 in which said lubricant is stearamide.
10. An expandable polystyrene composition comprising an extrudate of 100 parts by weight polystyrene having 0.2–0.5 part by weight citric acid and 0.01–3.0 parts by weight lubricant incorporated therein by extrusion at a temperature of about 450° F., said lubricant selected from the class consisting of amides of fatty acids that contain between 12–30 carbon atoms, said extrudate coated with a carbon dioxide liberating agent selected from the class consisting of alkali and alkaline earth carbonates and bicarbonates.
11. An expandable polystyrene composition comprising an extrudate of 100 parts by weight polystyrene having 0.2–0.5 part by weight citric acids, 0.01–3.0 parts by weight lubricant and an aliphatic hydrocarbon blowing agent incorporated therein, said lubricant selected from the class consisting of amides of fatty acids containing between 12–30 carbon atoms, said extrudate coated with a carbon dioxide liberating agent selected from the class consisting of alkali and alkaline earth carbonates and bicarbonates.
12. An expandable polystyrene composition as set forth in claim 11 in which said carbon dioxide liberating agent is sodium bicarbonate.
13. A component of an expandable polystyrene composition as set forth in claim 8 wherein said lubricant is ethylene distearamide.
14. A component of an expandable polystyrene composition as set forth in claim 8 wherein said lubricant is behenamide.

References Cited
UNITED STATES PATENTS

| | | | |
|---|---|---|---|
| 2,857,341 | 10/1958 | Colwell et al. | 260—2.5 |
| 2,861,898 | 11/1958 | Platzer | 260—2.5 |
| 2,941,964 | 6/1960 | Houston et al. | 260—2.5 |
| 2,956,035 | 10/1960 | Mock | 260—23 |
| 3,089,857 | 5/1963 | Pottenger | 260—2.5 |
| 2,948,698 | 8/1960 | Cocci | 260—32.6 |

MURRAY TILLMAN, *Primary Examiner.*

GEORGE F. LESMES, *Examiner.*

M. J. TULLY, *Assistant Examiner.*